(12) United States Patent
Zelm

(10) Patent No.: US 6,773,025 B1
(45) Date of Patent: Aug. 10, 2004

(54) COLLAPSIBLE TRAILER

(76) Inventor: Jamie B. Zelm, W6779 Sugar La., Onalaska, WI (US) 54650

(*) Notice: Subject to any disclaimer, the term of this patent is extended or adjusted under 35 U.S.C. 154(b) by 29 days.

(21) Appl. No.: 10/306,106

(22) Filed: Nov. 27, 2002

(51) Int. Cl.[7] ................................................. B62B 1/20
(52) U.S. Cl. ........................ 280/656; 280/40; 280/645; 280/648; 280/482
(58) Field of Search .......................... 280/638, 35, 639, 280/38, 39, 40, 641, 645, 648, 656, 482, 491.1; 296/26.02, 26.12, 26.14

(56) References Cited

U.S. PATENT DOCUMENTS

| | | | |
|---|---|---|---|
| 2,691,546 A | * 10/1954 | Rober | 296/181.7 |
| 2,826,425 A | * 3/1958 | Hoeper | 280/639 |
| 3,612,600 A | * 10/1971 | Salichs | 296/181.7 |
| 4,126,324 A | * 11/1978 | Browning | 280/42 |
| 4,175,768 A | 11/1979 | Thackray | 280/652 |
| 4,196,918 A | * 4/1980 | Strader | 280/478.1 |
| 4,230,340 A | * 10/1980 | Wasservogel | 280/656 |
| 4,239,258 A | * 12/1980 | Burris | 280/639 |
| 4,362,316 A | * 12/1982 | Wright | 280/656 |
| 4,453,735 A | * 6/1984 | Penverne et al. | 280/43.18 |
| 4,645,230 A | * 2/1987 | Hammons | 280/656 |
| 4,746,142 A | * 5/1988 | Davis | 280/656 |
| 4,768,806 A | 9/1988 | Tetreault | 280/656 |
| 4,995,129 A | 2/1991 | Comardo | 14/71.1 |
| 5,340,134 A | * 8/1994 | Dodson | 280/37 |
| 5,340,145 A | * 8/1994 | Leib et al. | 280/656 |
| 6,164,683 A | * 12/2000 | Kalman | 280/656 |
| 6,511,092 B1 | * 1/2003 | Chepa | 280/656 |
| 6,585,285 B2 | * 7/2003 | Koch | 280/656 |

* cited by examiner

*Primary Examiner*—Bryan Fischmann
*Assistant Examiner*—Brian Swenson
(74) *Attorney, Agent, or Firm*—Donald J. Ersler (57) ABSTRACT

A collapsible trailer preferably includes a lengthwise base frame, a first deck member, a second deck member, an axle, and at least two wheels. The axle is preferably pivotally attached to a bottom of the lengthwise base frame. At least one wheel is pivotally retained on each end of the axle. A length of the first deck is pivotally attached to a length of the second deck with a continuous hinge or the like. Each end of the continuous hinge is retained by the lengthwise base frame. A first side rail is attachable to the first deck and a second side rail is attachable to the second deck. A hitch handle extends from one end of the lengthwise base frame.

12 Claims, 10 Drawing Sheets

COLLAPSIBLE TRAILER

BACKGROUND OF THE INVENTION

1. Field of the Invention

The present invention relates generally to trailers and more specifically to a collapsible trailer, which includes an axle that is capable of pivoting relative to a pair of folding deck members for reducing the space required for storage.

2. Discussion of the Prior Art

There are at least three trailers that may be folded along a center length. U.S. Pat. No. 4,175,768 to Thrackray discloses a collapsible trailer. Thrackray includes a base that folds down a center length and a pair of partial axles which slide out from a side portion thereof. U.S. Pat. No. 4,768,806 to Tetreault discloses a collapsible trailer. Tetreault includes a pair of longitudinal sections that are pivotally connected along a length thereof and a pair wheels; each wheel is retained in a V-shaped frame. U.S. Pat. No. 4,995,129 to Comardo discloses a collapsible trailer/ramp. Comardo includes a pair deck plates that are pivotally connected along a length thereof and a pair of removable wheel assemblies.

Accordingly, there is a clearly felt need in the art for a collapsible trailer, which includes a pair of folding deck members and an axle that is capable of pivoting relative to the pair of folding deck members.

SUMMARY OF THE INVENTION

The present invention provides a collapsible trailer, which includes an axle that pivots relative to a base thereof. The collapsible trailer preferably includes a lengthwise base frame, a first deck member, a second deck member, an axle, and at least two wheels. The lengthwise base frame includes a lengthwise frame, two retention plates, and a pivotal support bracket. Each end of the lengthwise frame is terminated with a retention plate. The pivotal support bracket extends downward from substantially a middle of the lengthwise frame. The axle includes an axle frame, an axle member, two locking devices, and an axle thrust plate. The axle member extends outward from each end of the axle frame. Each end of the axle member is sized to pivotally receive a single wheel. A first locking device is disposed on a first end of the axle frame and a second locking device is disposed on a second end of the axle frame. The axle thrust plate is attached to a top of the axle frame at substantially a middle thereof.

A length of the first deck member is pivotally attached to a length of the second deck member with a continuous hinge or the like. Each end of the continuous hinge is pivotally retained with a single retention plate. A plurality of first side rail holders are formed on an outer perimeter of the first deck member. A plurality of second side rail holders are formed on an outer perimeter of the second deck member. The plurality of first side rail holders receive a first side rail. The plurality of second side rail holders receive a second side rail.

A first vertical support member is pivotally attached to a bottom of the first deck member and a second vertical support member is pivotally attached to a bottom of the second deck member. The first vertical support member is retained against the axle frame with the first locking device and the second vertical support member is retained against the axle frame with the second locking device. A hitch handle includes a hitch lock and a hitch frame. The hitch frame is preferably retained in an end of the lengthwise frame with a locking pin. The hitch lock is capable of being secured to a hitch.

Accordingly, it is an object of the present invention to provide a collapsible trailer, which includes a pair of deck members that are pivotally connected along a length thereof.

Finally, it is another object of the present invention to provide a collapsible trailer, which includes an axle that is capable of pivoting relative to a pair of deck members.

These and additional objects, advantages, features and benefits of the present invention will become apparent from the following specification.

DETAILED DESCRIPTION OF THE PREFERRED EMBODIMENTS

Figure 1:
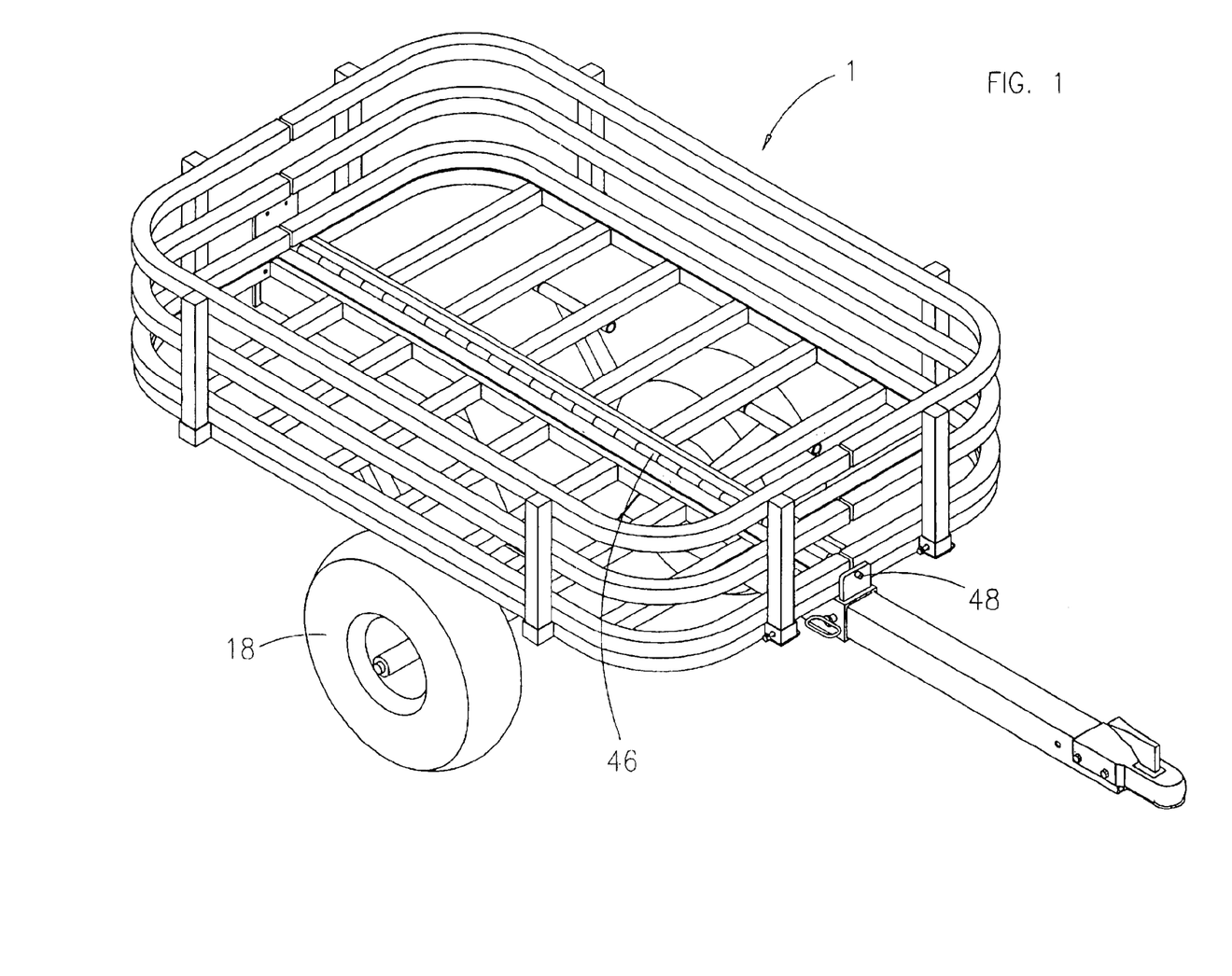
FIG. 1 is a perspective view of a collapsible trailer with first and second side rails in accordance with the present invention.

With reference now to the drawings, and particularly to FIG. 1, there is shown a perspective view of a collapsible trailer 1. With reference to FIGS. 2–7, the collapsible trailer 1 preferably includes a lengthwise base frame 10, a first deck member 12, a second deck member 14, an axle 16, and two wheels 18. The lengthwise base frame 10 includes a lengthwise frame 20, a rear retention plate 22, a front retention plate 24 and a pivotal support bracket 26. The lengthwise frame 20 is preferably a rectangular tube, but other structures may also be used. The rear retention plate 22 extends upward from a rear of the lengthwise frame 20 and the front retention plate 24 extends upward from a front of the lengthwise frame 20. The pivotal support bracket 26 includes two support members 28 and a base thrust plate 30. A single support plate 28 is attached to each side of the lengthwise frame 20 at substantially the middle thereof with any suitable attachment process, such as welding. The base thrust plate 30 is attached to a bottom of the two support members 28 with any suitable attachment process.

Figure 2:
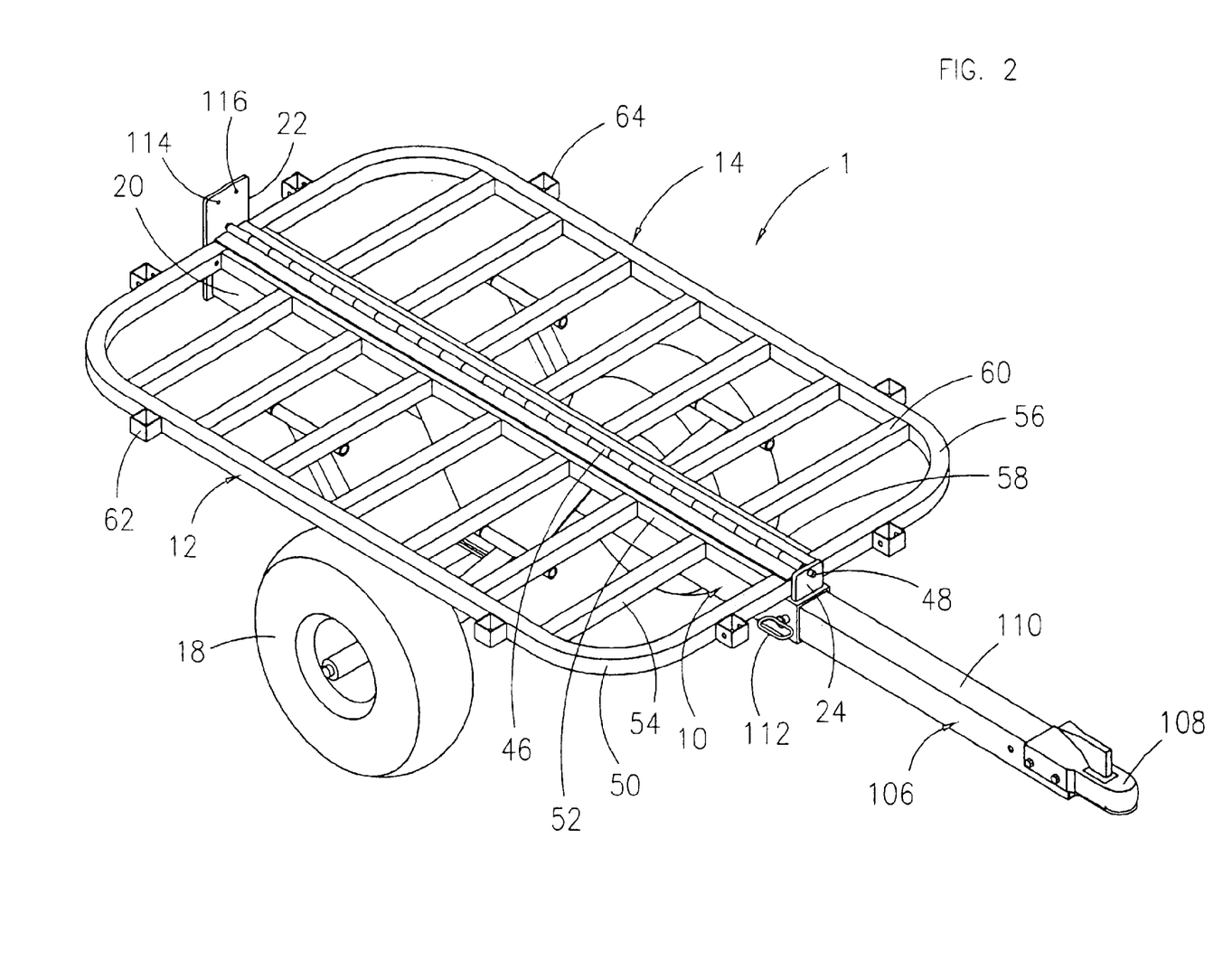
FIG. 2 is a perspective view of a collapsible trailer in accordance with the present invention.
Figure 6:
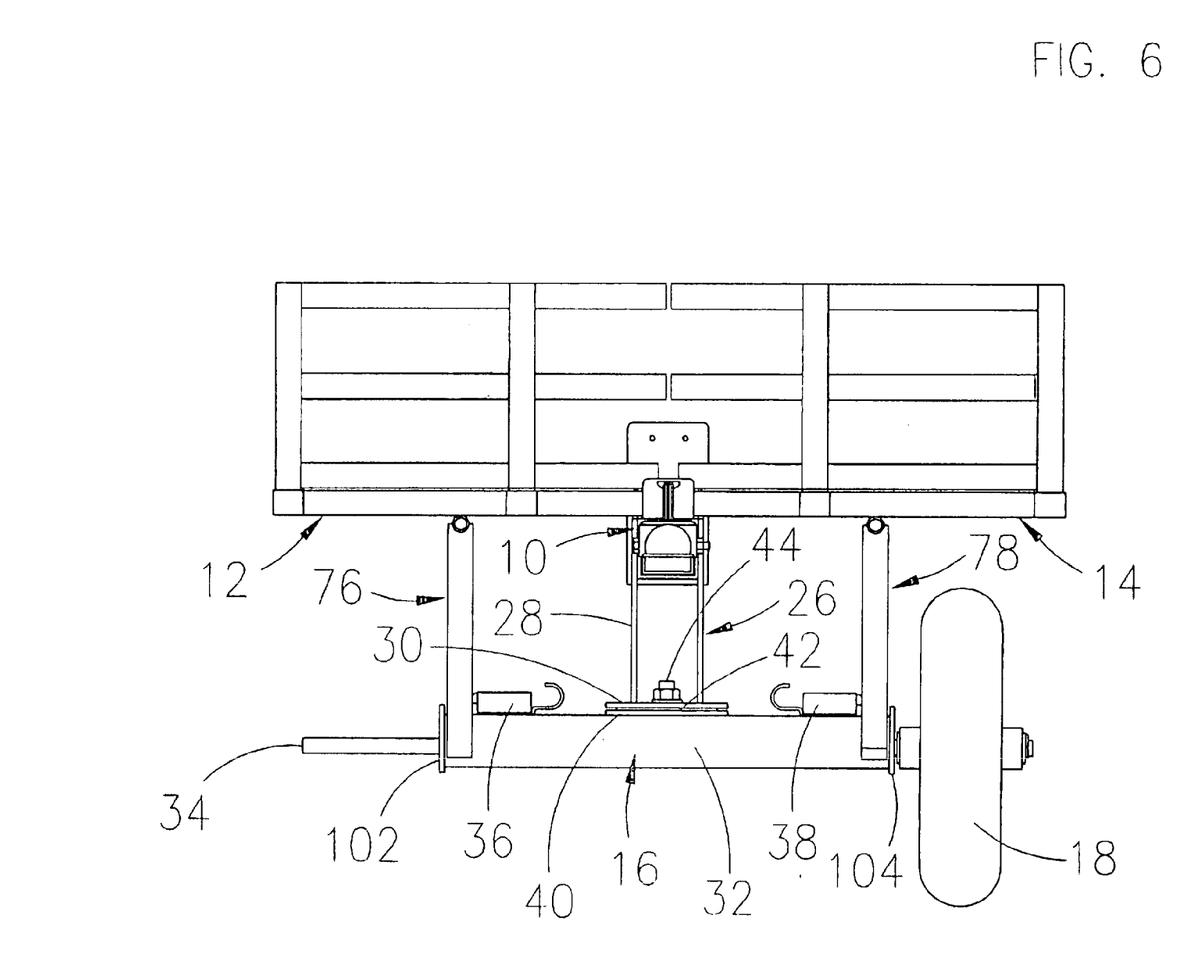
FIG. 6 is a front end view of a collapsible trailer with first and second side rails and one of the wheels removed in accordance with the present invention.

The axle 16 includes an axle frame 32, an axle member 34, a first locking device 36, a second locking device 38 and an axle thrust plate 40. The axle member 34 extends outward from each end of the axle frame 32. Each end of the axle member 34 is sized to pivotally receive at least one wheel 18. Each wheel 18 may be retained on each end of the axle member 34 with any suitable retention method, such as a cotter pin. Although a smaller wheel is shown, the invention should include the use of any size wheel, such as an automobile wheel. The first locking device 36 is disposed on a first end of the axle frame 32 and a second locking device 38 is disposed on a second end of the axle frame 32. The pivotal thrust plate 40 is attached to a top of the axle frame 32 at substantially middle thereof with any suitable fastening process. A thrust washer 42 is preferably inserted between the base thrust plate 30 and the axle thrust plate 40. The lengthwise base frame 10 is pivotally attached to the axle 16 with a fastener 44 or any other suitable pivotal retention device.

Figure 4:
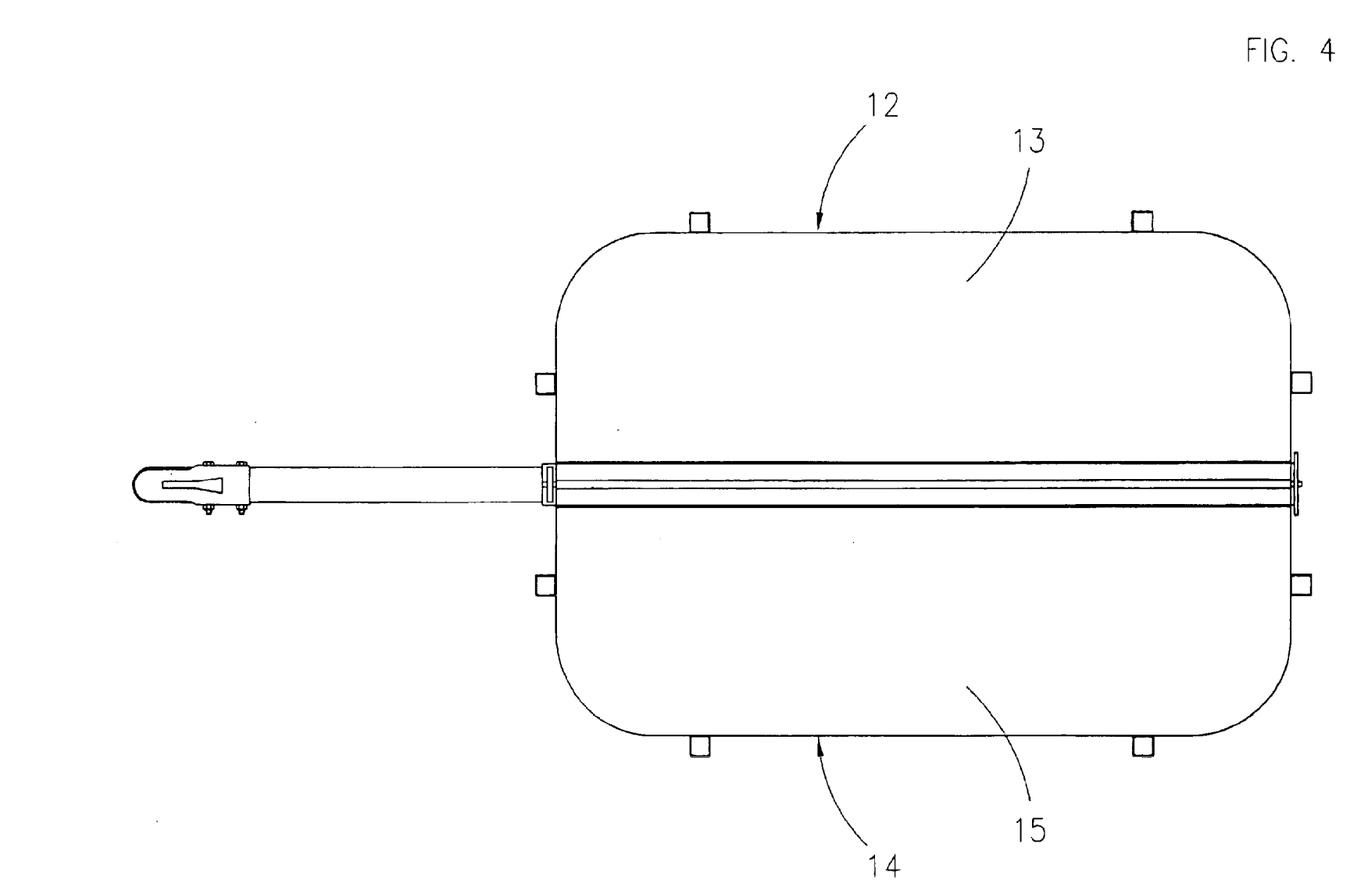
FIG. 4 is a top view of a collapsible trailer with a pair of bed liners installed in accordance with the present invention.
Figure 5:
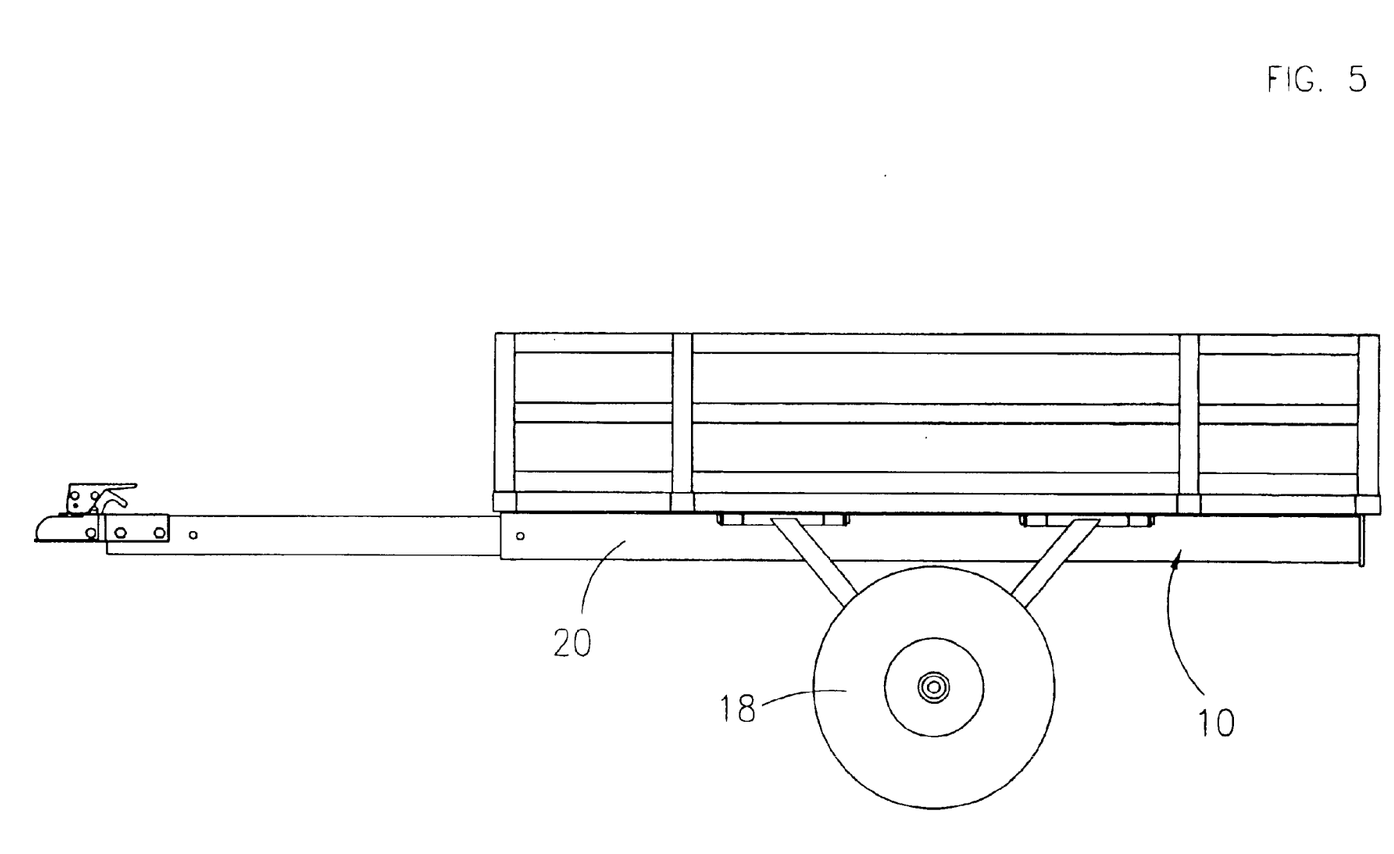
FIG. 5 is a side view of a collapsible trailer with first and second side rails in accordance with the present invention.

A length of the first deck member 12 is pivotally attached to a length of the second deck member 14 with a continuous hinge 46 or the like. A pivot pin 48 of the continuous hinge 46 is pivotally retained on each end by the front and rear retention plates. The first deck member 12 preferably includes a first perimeter tube 50, a first lengthwise tube 52 and at least one first cross tube 54. The second deck 14 preferably includes a second perimeter tube 56, a second lengthwise tube 58 and at least one second cross tube 60. The tubes of the first and second deck members are preferably attached to each other with welding, but other attachment methods may also be used. A first bed liner 13 may be placed over the first deck member 12. A second bed liner 15 may be placed over the second deck member 14. The first and second deck members are disclosed as being fabricated from tubing, but other structural fabrication methods could also be used, such as a flat plate with a reinforced perimeter.

Figure 3:
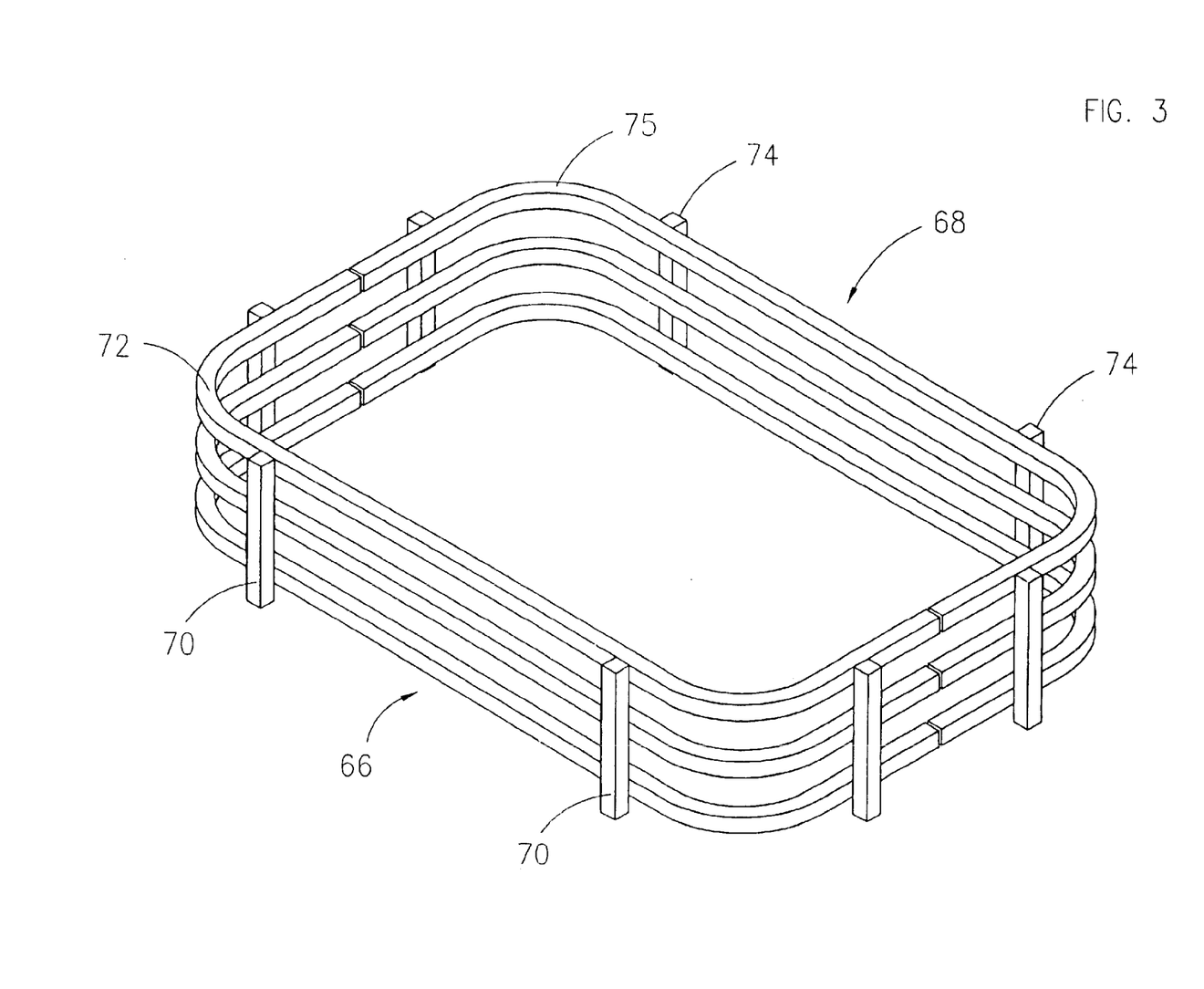
FIG. 3 is a perspective view of a first and second side rails of a collapsible trailer in accordance with the present invention.

A plurality of first side rail holders 62 are formed on an outer perimeter of the first deck member 12. A plurality of second side rail holders 64 are formed on an outer perimeter of the second deck member 14. The plurality of first side rail holders 62 receive a first side rail 66. The plurality of second side rail holders 64 receive a second side rail 68. The first side rail 66 includes a plurality of first vertical rail members 70 and at least two first perimeter rail members 72, which are attached to the plurality of first vertical rail members 70 with welding or any other suitable attachment method. The second side rail 68 includes a plurality of second vertical rail members 74 and at least two first perimeter rail members 75, which are attached to the plurality of first vertical rail members 74 with welding or any other suitable attachment method. The plurality of vertical rail members are retained in the rail holders with a locking pin, fastener or any other securing device.

Figure 8:
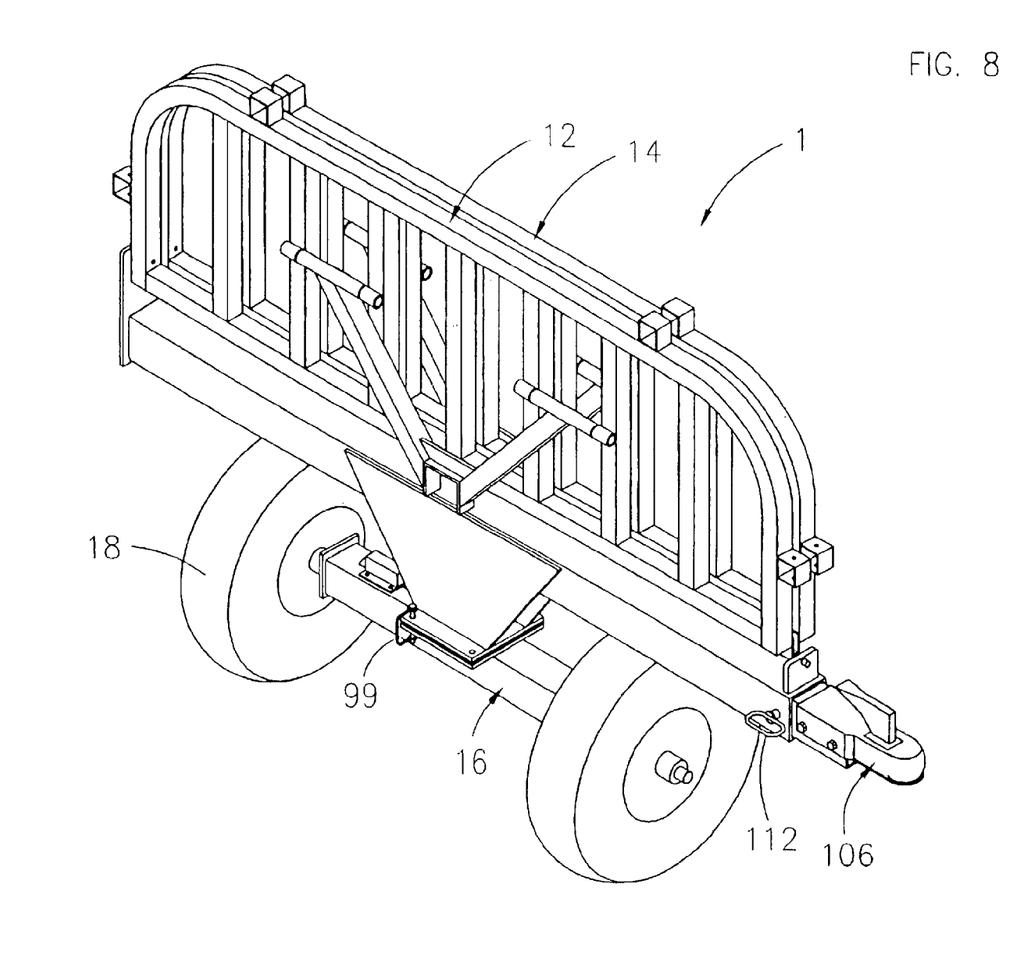
FIG. 8 is a perspective view of a collapsible trailer with first and second deck members folded-up vertically and an axle rotated 90 degrees in accordance with the present invention.

A first vertical support member 76 is pivotally attached to a bottom of the first deck member 12 and a second vertical support member 78 is pivotally attached to a bottom of the second deck 14. Each vertical support member includes a first support arm 80, a second support arm 82, and axle bracket 84. One end of the first support arm 80 extends outward from one side of the axle bracket 84 and one end of the second support arm 82 extends from the other side of the axle bracket 84. The axle bracket 84 is sized to receive the axle frame 32. A first pivoting tube 86 terminates the other end of the first support arm 80 and a second pivoting tube 88 terminates the other end of the second support arm 82. The first pivoting tube 86 is pivotally retained between a pair of first deck tubes 90 with a first pivot pin 92. The second pivoting tube 88 is pivotally retained between a pair of second deck tubes 94 with a first pivot pin 96. The first and second vertical support members support the first and second decks relative to the axle 16. The first and second vertical support members also secure the angular orientation of the first and second deck relative to the axle 16. With reference to FIG. 8, at least one locking pin 99 may be inserted through the base thrust plate 30 and the axle thrust plate 40 to prevent the lengthwise base frame 10 from rotating relative to the axle 16.

Figure 6A:
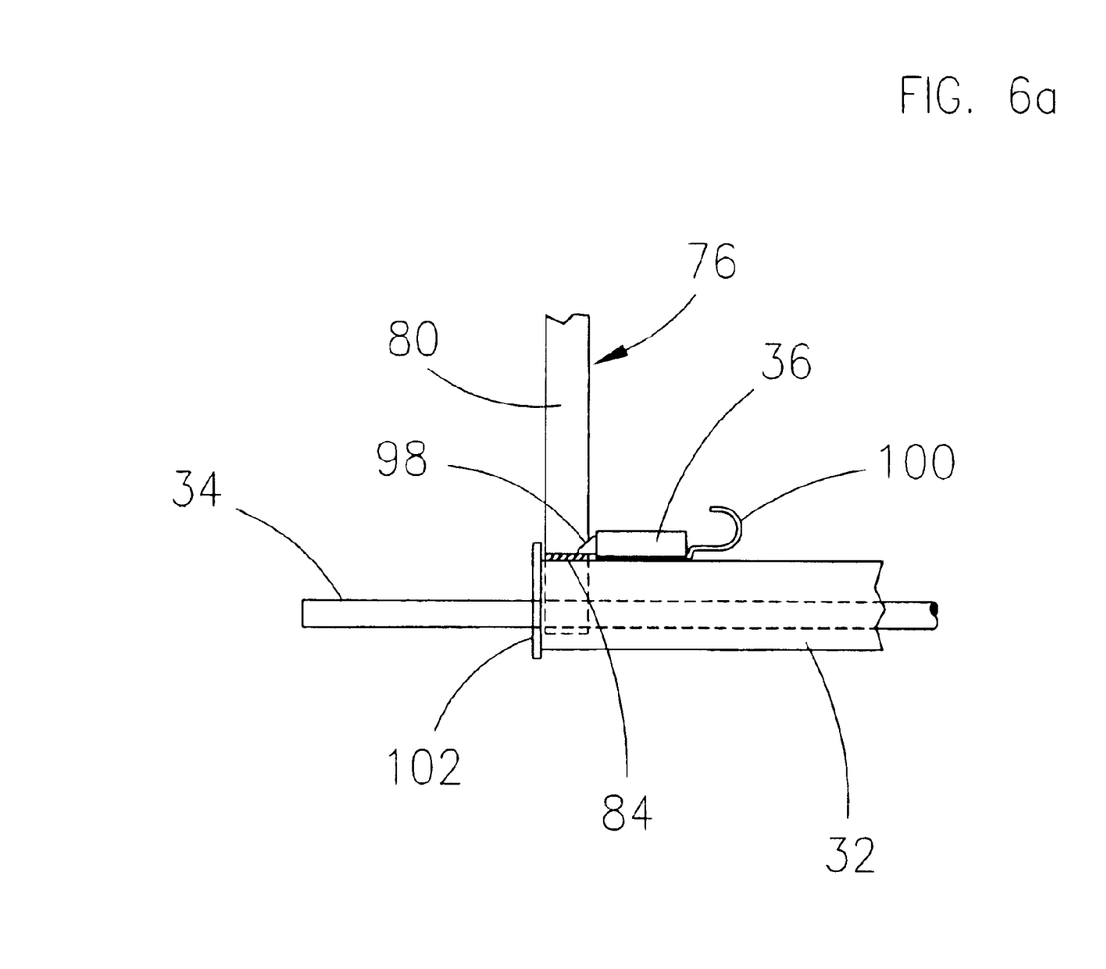
FIG. 6a is a partial cross sectional view of a first locking device retaining a first vertical support member against an axle frame of a collapsible trailer in accordance with the present invention.
Figure 7:
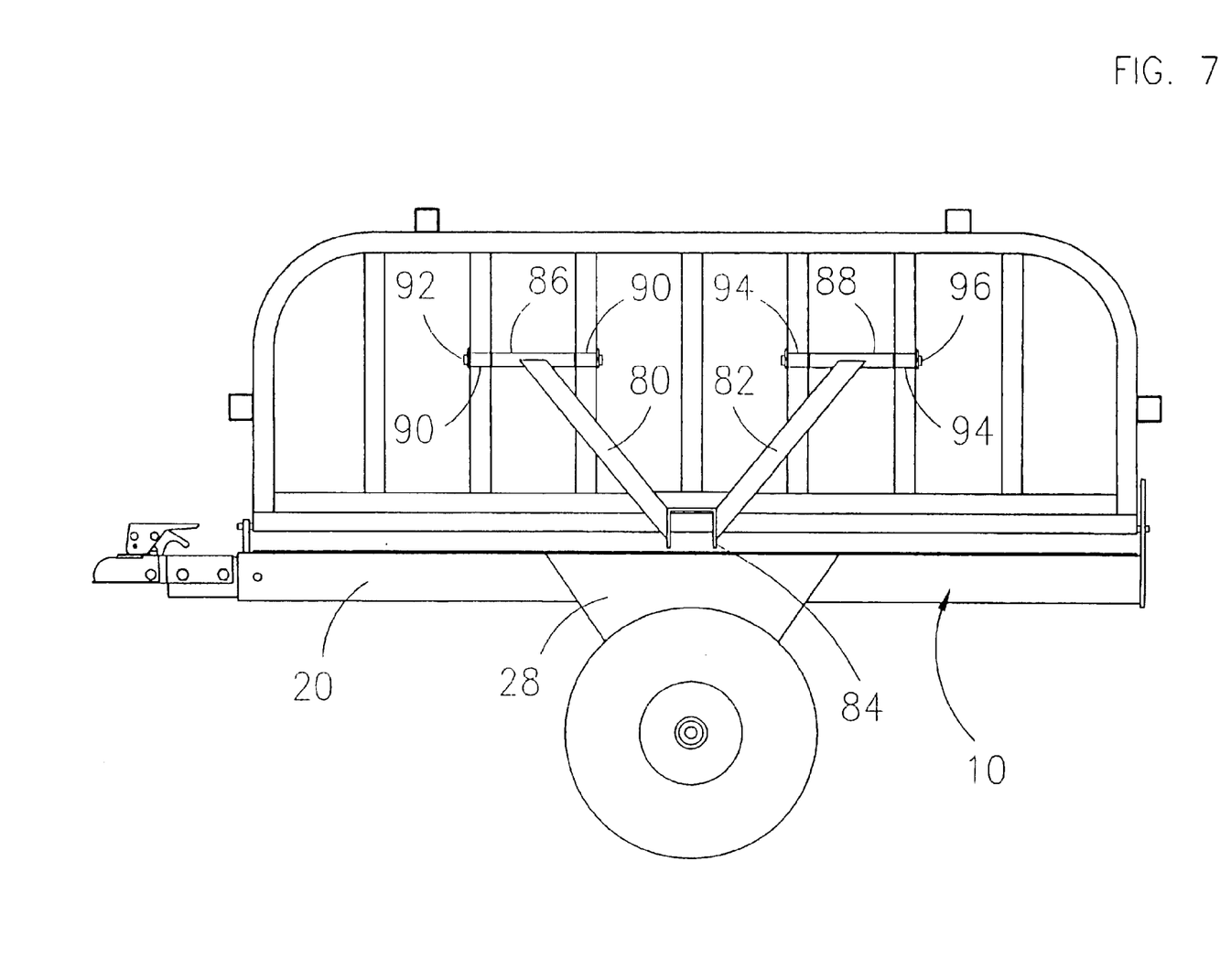
FIG. 7 is a side view of a collapsible trailer with first and second deck members folded-up vertically in accordance with the present invention.

The first vertical support member 76 is retained vertically, relative to the axle frame 32 with the first locking device 36. With reference to FIG. 6a, each locking device includes a retractable locking pin 98 and a retraction handle 100. The retractable locking pin 98 is spring loaded such that thereof is normally in an extended position. The retraction handle 100 is used to retract the retractable locking pin 98. Retractable pins are well known in the art and need not be shown in detail. The first vertical support member 76 is also retained laterally relative to the axle frame 32 between a first stop 102 and the first locking device 36. The second vertical support member 78 is retained vertically, relative to the axle frame 32 with the second locking device 38. The second vertical support member 78 is also retained laterally relative to the axle frame 32 between a second stop 104 and the second locking device 38. The first and second stops are secured to the first and second ends of the axle frame 32 with welding or any other suitable attachment method.

A hitch handle 106 includes a hitch frame 110 terminated by a hitch lock 108. The hitch lock 108 is capable of being secured to a hitch. An outer perimeter of the hitch frame 110 is sized to be received by an inner perimeter of the lengthwise frame 20. The hitch handle 106 has an extended position as illustrated in FIG. 2 and a retracted position as illustrated in FIG. 8. The hitch handle 106 is preferably retained in the extended and retracted positions with a locking pin 112.

Figure 9:
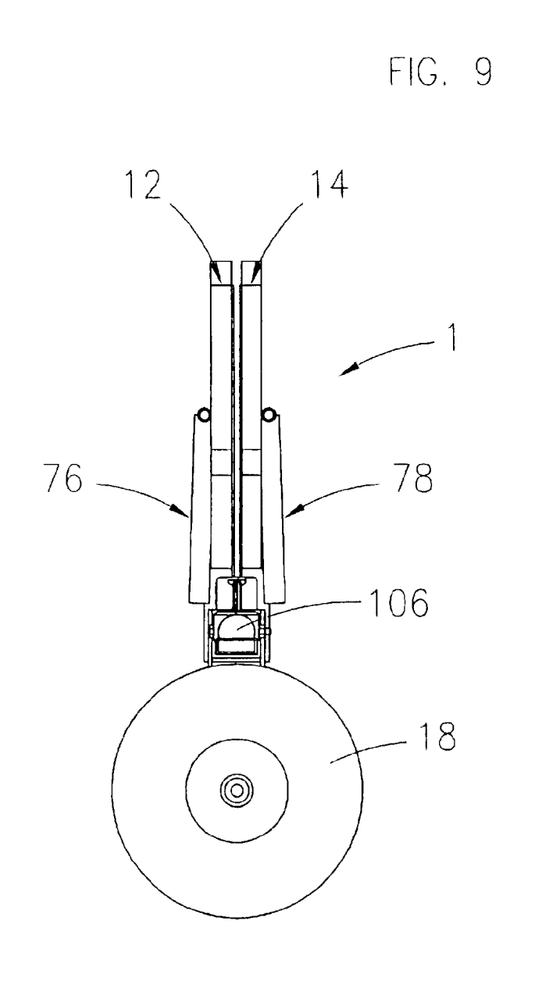
FIG. 9 is a front end view of a collapsible trailer with first and second deck members folded-up vertically and an axle rotated 90 degrees in accordance with the present invention.

The first and second deck members are capable of being folded together and retained in a substantially vertical position. To retain the first deck member 12 in a substantially vertical position, a locking pin or the like is inserted through the first deck member 12 and a first retention hole 114 in the rear retention plate 22. To retain the second deck member 14 in a substantially vertical position, a locking pin or the like is inserted through the second deck member 14 and a second retention hole 116 in the rear retention plate 22. With reference to FIGS. 8 & 9, the axle 16 may be rotated relative to the lengthwise base frame 10 to reduce the amount of area taken-up by a folded-up collapsible trailer 1, when stored. The at least one locking pin 99 is inserted through the base thrust plate 30 and the axle thrust plate 40 to prevent the lengthwise base frame 10 from rotating relative to the axle 16 in a stored or nonstored orientation.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of forming a collapsible trailer, comprising the steps of:

providing a first deck and a second deck, a length of said first deck being pivotally attached to a length of said second deck;

securing pivotally an axle below said first and second decks, at least one wheel extending from each end of said axle;

providing a first vertical support member and a second vertical support member, one end of said first vertical support member being pivotally attached to said first deck along said length, one end of said second vertical support member being pivotally attached to said second deck along said length, the other ends of said first and second vertical support members being engagable with said axle; and securing removably the other end of said first vertical support member to said axle with a first locking device, securing the other end of said second vertical support member to said axle with a second locking device.

2. The method of forming a collapsible trailer of claim 1, further comprising the step of:

retaining each end of said first and second decks with a lengthwise base frame, pivotally attaching said axle to a bottom of said base frame.

3. The method of forming a collapsible trailer of claim 2, further comprising the step of:

providing a hitch handle, said hitch handle including a hitch lock that terminates one end of a hitch frame, the other end of said hitch frame being received by an end of said lengthwise base frame.

4. The method of forming a collapsible trailer of claim 2, further comprising the step of:

providing said lengthwise base frame with a rear retention plate, said first and second decks being secured to said rear retention plate to retain said first and second decks in a substantially vertical orientation.

5. The method of forming a collapsible trailer of claim 1, further comprising the step of:

providing a first side rail for retention by said first deck and a second side rail for retention by said second deck.

6. A method of forming a collapsible trailer, comprising the steps of:

providing a first deck and a second deck, a length of said first deck being pivotally attached to a length of said second deck;

retaining each end of said first and second deck with a lengthwise base frame;

securing pivotally an axle to said lengthwise base frame, at least one wheel extending from each end of said axle;

providing a first vertical support member and a second vertical support member, one end of said first vertical support member being pivotally attached to said first deck along said length, one end of said second vertical support member being pivotally attached to said second deck along said length, the other ends of said first and second vertical support members being engagable with said axle; and securing removably the other end of said first vertical support member to said axle with a first locking device, securing the other end of said second vertical support member to said axle with a second locking device.

7. The method of forming a collapsible trailer of claim 6, further comprising the step of:

providing a hitch handle, said hitch handle including a hitch lock that terminates one end of a hitch frame, the other end of said hitch frame being received by an end of said lengthwise base frame.

8. The method of forming a collapsible trailer of claim 6, further comprising the step of:

providing said lengthwise base frame with a rear retention plate, said first and second decks being secured to said rear retention plate to retain said first and second decks in a substantially vertical orientation.

9. The method of forming a collapsible trailer of claim 6, further comprising the step of:

providing a first side rail for retention by said first deck and a second side rail for retention by said second deck.

10. A method of forming a collapsible trailer, comprising the steps of:

providing a first deck and a second deck, a length of said first deck being pivotally attached to a length of said second deck;

providing a first side rail for retention by said first deck and a second side rail for retention by said second deck;

retaining each end of said first and second deck with a lengthwise base frame;

providing an axle with at least one wheel extending from each end thereof, pivotally securing said axle to said lengthwise base frame;

providing a first vertical support member and a second vertical support member, one end of said first vertical support member being pivotally attached to said first deck along said length, one end of said second vertical support member being pivotally attached to said second deck along said length, the other ends of said first and second vertical support members being engagable with said axle; and securing removably the other end of said first vertical support member to said axle with a first locking device, securing the other end of said second vertical support member to said axle with a second locking device.

11. The method of forming a collapsible trailer of claim 10, further comprising the step of:

hitch lock that terminates one end of a hitch frame, the other end of said hitch frame being received by an end of said lengthwise base frame.

12. The method of forming a collapsible trailer of claim 10, further comprising the step of:

providing said lengthwise base frame with a rear retention plate, said first and second decks being secured to said rear retention plate to retain said first and second decks in a substantially vertical orientation.

* * * * *